United States Patent [19]

Elghani et al.

[11] 3,882,192
[45] May 6, 1975

[54] POLYCARBONATE-POLYVINYL CHLORIDE MOULDING COMPOSITIONS

[75] Inventors: Salah Elabd Elghani; Winfried Fischer, both of Cologne, Germany; Michael Koehler, Wien, Austria; Johannes Lindner, Hamburg; Richard Prinz, Leverkusen, both of Germany

[73] Assignee: Bayer Aktiengesellschaft, Leverkusen, Germany

[22] Filed: Jan. 28, 1974

[21] Appl. No.: 437,154

[30] Foreign Application Priority Data
Feb. 1, 1973 Germany............................ 2304894

[52] U.S. Cl.................. 260/873; 260/876; 260/899
[51] Int. Cl.............................................. C08g 39/10
[58] Field of Search............. 260/873, 75 R, 92.8 R

[56] References Cited
UNITED STATES PATENTS

| 3,130,177 | 4/1964 | Grabowski | 260/873 X |
|---|---|---|---|
| 3,239,582 | 3/1966 | Keskkula et al. | 260/873 |
| 3,305,605 | 2/1967 | Hostettler et al. | 260/873 |
| 3,663,471 | 5/1972 | Schirmer et al. | 260/873 X |

*Primary Examiner*—Melvin Goldstein
*Assistant Examiner*—E. A. Nielsen
*Attorney, Agent, or Firm*—Connolly and Hutz

[57] ABSTRACT

Moulding compositions consisting of
a. 5 – 95 parts by weight of a polycarbonate,
b. 5 – 95 parts by weight of a vinyl chloride polymer and
c. 5 – 95 parts by weight of an ABS graft polymer, a styrene/maleic anhydride copolymer or an ethylene/vinyl acetate copolymer.

3 Claims, No Drawings

POLYCARBONATE-POLYVINYL CHLORIDE MOULDING COMPOSITIONS

This invention relates to thermoplastic moulding compositions of a. 5 – 95 parts by weight of a polycarbonate,
b. 5 – 95 parts by weight of a vinyl chloride polymer and
c. 5 – 95 parts by weight of an ABS polymer or of a styrene/maleic anhydride copolymer or of an ethylene/vinyl acetate copolymer.

Preferred moulding compositions contain 20 to 80 parts by weight of each of (a), (b) and (c).

Particularly preferred moulding compositions contain a. 30 – 50 parts by weight of polycarbonate,
b. 30 – 50 parts by weight of polyvinyl chloride and
c. 30 – 50 parts by weight of ABS graft polymer.

Polycarbonates for the purpose of this invention are preferably polycarbonates based on divalent phenols, e.g. hydroquinone, resorcinol, 4,4′-dihydroxydiphenyl, bis-(4-hydroxyphenyl)-alkanes, -cycloalkanes, -ethers, -sulphones or -ketones, bisphenols which are halogenated in the nucleus and $\alpha$, $\alpha'$-bis-(p-hydroxyphenyl)-p.diisopropyl-benzene. The preferred phenols are 4,4′-dihydroxy-di-phenylpropane-(2,2) (bisphenol A), tetrachlorobisphenol A, tetrabromobisphenol A and trinuclear bisphenols such as $\alpha$, $\alpha'$-bis-(4-hydroxyphenyl)-p-diisopropylbenzene. The preparation of polycarbonates from these phenols is already known. Polycarbonates are basically prepared by reacting phenols with derivatives of carbonic acid such as phosgene or bischlorocarbonic acid esters. Particularly suitable polycarbonates have molecular weights of 10,000 to 100,000, preferably 20,000 to 60,000 (US. Patent Nos. 3,028,365; 2,999,835; 3,148,172; 3,271,368; 2,970,137; 2,991,273; 3,271,367; 3,280,078; 3,014,891 and 2,999,846).

Vinyl chloride polymers for the purpose of this invention are polyvinyl chloride and copolymers of vinyl chloride with olefinically unsaturated polymerisable compounds which contain at least 80 percent by weight of vinyl chloride incorporated by polymerisation. Olefinically unsaturated compounds which are suitable for copolymerisation are, for example, vinylidene halides such as vinylidene chloride and vinylidene fluoride, vinyl esters such as vinyl acetate, vinyl propionate, vinyl butyrate, vinyl chloroacetate, vinyl benzoate, acrylic and $\alpha$-alkyl-acrylic acids and their alkyl esters, amides and nitriles such as acrylic acid, methacrylic acid, methyl methacrylate, ethyl acrylate, 2-ethyl-hexyl acrylate, butyl methacrylate, acrylamide, N-methyl acrylamide, acrylonitrile and methacrylonitrile, aromatic vinyl compounds such as styrene and vinyl naphthalene and olefinically unsaturated hydrocarbons such as ethylene, bicyclo-[2,2,1]-hept-2-ene and bicyclo-[2,2,1]-hepta-2,5-dienes. These vinyl chloride polymers are known and can be prepared by the usual methods of emulsion, suspension, bulk or mass polymerisation. Vinyl chloride polymers which have molecular weights of 40,000 to 60,000 are preferred. The vinyl chloride polymers may contain the usual additives such as dyes, pigments, stabilisers, lubricants and plasticizers. Rechlorinated polyvinyl chloride or chlorinated polyethylene are also suitable (see DAS No. 1,098,716).

ABS graft polymers are in particular elastic-thermoplastic products which are obtained by polymerising 95 – 50 percent by weight of a monomer mixture of 95 – 50 parts by weight of styrene, styrene alkylated in the nucleus or side chain, methyl methacrylate or mixtures thereof and 5 – 50 parts by weight of acrylonitrile, alkyl acrylonitrile, methyl methacrylate or mixtures thereof, entirely or partly in the presence of 50 – 5 percent by weight of a rubber. Mixtures of such graft copolymers with a copolymer of 95 - 50% by weight of styrene or styrene which is alkylated in the nucleus or side chain, methyl methacrylate or mixtures thereof and 5 – 50 percent by weight of acrylonitrile, alkyl acrylonitrile, methyl methacrylate or mixtures thereof are also suitable (see British Pat. No. 794,400).

Rubbers suitable as grafting bases are, for example diene rubbers such as homopolymers of butadiene and isoprene or copolymers of butadiene or isoprene with up to 20 percent by weight of styrene. Other suitable rubbers are ethylenepropylene terpolymers. These are polymers of ethylene, propylene and a non-conjugated diene in which the proportion by weight of ethylene units to propylene units is from 20 : 80 to 80 : 20 and which contain up to 15 percent by weight of the non-conjugated diene incorporated by polymerisation. Preferred non-conjugated dienes are norbornadiene, hexadiene-(1,5) and ethylidene norbornene.

When preparing the ABS graft copolymers, 20 – 100 percent of the monomers present are generally graft to polymerised while the remainder are copolymerised separately and added.

Styrene/maleic anhydride copolymers which are used according to the invention may contain the two monomer components in practically any by weight ratio. The molecular weight may also vary within wide limits. The copolymers are generally prepared by reacting maleic anhydride and styrene at elevated temperatures in the presence of peroxide catalysts. Styrene may also be partly or completely replaced by its derivatives such as $\alpha$-methyl styrene, vinyl toluene, 2,4-dimethyl styrene or chlorostyrene. The copolymers of styrene and maleic acid anhydride generally have molecular weights of 2,000 to 300,000, preferably 80,000 to 200,000. The amount of maleic anhydride units is generally 5 – 50 percent by weight, preferably 5 – 30 percent by weight (see U.S. Pat. Nos. 2,866,771 and 2,971,939).

Suitable ethylene/vinyl acetate copolymers may contain 1 – 80 percent by weight of vinyl acetate, preferably 3 – 50% by weight. The products may be prepared e.g. by high-pressure polymerisation or by polymerisation in emulsion or solution. Their molecular weights are generally between 10,000 and 500,000, preferably between 80,000 and 120,000 (see U.S. Pat. No. 3,325,460).

To prepare the moulding compositions according to the invention, solutions of the three polymer components in suitable inert organic solvents (e.g. chlorinated hydrocarbons such as methylene chloride, chloroform, chlorobenzene or phenols such as cresol or phenol) may be mixed together. The usual additives such as stabilisers, lubricants, dyes or effect substances may then be added to the mixtures. ABS graft polymers are usually not in true solution but in the form of fine dispersions, e.g. colloidal dispersions. The moulding compositions can be isolated from the solutions by precipitation with non-solvents or by removal of the solvents by distillation.

The moulding compositions are preferably prepared by mixing the polymer components in the molten state.

For this purpose, the components may be melted together, mixed and extruded, e.g. in extruders fitted with mixing devices. Alternatively, the polymers may be melted separately and then extruded together. It is particularly preferred first to mix the vinyl chloride polymer with the ABS graft polymer, the styrene/maleic anhydride copolymer or ethylene/vinyl acetate copolymer by melting them together and then to add the polycarbonate, optionally also in the molten state, to this molten mixture.

The mixtures according to the invention are thermoplastic moulding compositions which are suitable for injection moulding, extrusion and calendering. Their impact strength, notched impact strength and heat distortion temperature are substantially greater than those of polyvinyl chloride. Their ball indentation hardness, tensile strength, flexural strength, flame resistance and elastic modulus are considerably better than the corresponding values of polycarbonate.

EXAMPLE 1

A pulverulent mixture of 55 parts by weight of ABS graft polymer (from 15 parts of butadiene, 63 parts of styrene and 22 parts of acrylonitrile) and 5 parts of polyvinyl chloride (PVC) is plasticised at 200°C. The stabilised polyvinyl chloride to which lubricants have been added has the following composition:

100 parts of suspension PVC (K-value 70), 4.5 parts of di-n-octyl-tin dithioglycollic acid ester and 1 part of Loxiol G 33 (Henkel, Desseldorf).

40 parts of a polycarbonate of 4,4'-dihydroxy-di-phenyl-propane-(2,2) having a relative viscosity of 1.28 (determined on a solution of 0.5 g of polycarbonate in 100 ml of methylene chloride) are melted in an extruder at about 250°C. The plasticised polycarbonate is added to the ABS/PVC mixture and the components are then mixed in the thermoplastic state.

Some mechanical properties of the moulding compositions obtained in this and the following examples are summarised in a table. The parts of the examples are in all cases parts by weight.

EXAMPLE 2

The moulding composition is prepared in the same way as described in Example 1, using the same polymers with the appropriate additives. The mixture consists of 40 parts of polycarbonate, 10 parts of polyvinyl chloride and 50 parts of ABS graft polymer.

EXAMPLE 3

The moulding composition is prepared as described in Example 1 using the same polymers with appropriate additives. The mixture consists of 40 parts of polycarbonate, 15 parts of polyvinyl chloride and 45 parts of ABS graft polymer.

EXAMPLE 4

The moulding composition is prepared as described in Example 1, using the same polymers with appropriate additives. The mixture consists of 40 parts of polycarbonate, 20 parts of polyvinyl chloride and 40 parts of ABS graft polymer.

EXAMPLE 5

The moulding composition is prepared as described in Example 1, using the same polymers with the appropriate additives. The mixture consists of 40 parts of polycarbonate, 35 parts of polyvinyl chloride and 25 parts of ABS graft polymer.

EXAMPLE 6

The moulding composition is prepared as described in Example 1, using the same polymers with the appropriate additives. The mixture consists of 40 parts of polycarbonate, 50 parts of polyvinyl chloride and 10 parts of ABS graft polymer.

EXAMPLE 7

35 parts of polyvinyl chloride are plasticised at 200°C. The polyvinyl chloride, stabilised and mixed with lubricants, has the same composition as in Example 1. A mixture of 40 parts of a polycarbonate of 4,4'-dihydroxydiphenyl-propane-(2,2) having a relative viscosity of 1.28 (determined on a solution of 0.5 g of the polycarbonate in 100 ml of methylene chloride) and 25 parts of a copolymer of styrene and maleic anhydride (molar ratio 88 : 12) which has a relative viscosity of 1.49 (determined on a solution of 0.5 g of the copolymer in 100 ml of methylene chloride) is melted in an extruder at about 250°C. This mixture of polycarbonate and styrene/maleic anhydride copolymer is added to a plasticised polyvinyl chloride and the components are then mixed in a thermoplastic state.

EXAMPLE 8

The moulding composition is prepared as described in Example 7, using the same polymers and appropriate additives. The mixture consists of 30 parts of polycarbonate, 40 parts of polyvinyl chloride and 30 parts of styrene/maleic anhydride copolymer.

EXAMPLE 9

A mixture of 30 parts of polyvinyl chloride and 5 parts of an ethylene/vinyl acetate copolymer which contains 45 percent by weight of vinyl acetate and has a molecular weight of about 100,000 is plasticised at about 200°C. The polyvinyl chloride has the same composition as in Example 1. The method employed is the same as described in Example 1 except that 65 parts of polycarbonate are used.

EXAMPLE 10

The moulding composition is prepared as described in Example 9 and the same polymers are used with the appropriate additives. The mixture consists of 40 parts of polycarbonate, 57 parts of polyvinyl chloride and 3 parts of ethylene/vinyl acetate copolymer.

| Property | Test Method | Measuring unit | EXAMPLES | | | | | | | | | |
|---|---|---|---|---|---|---|---|---|---|---|---|---|
| | | | 1 | 2 | 3 | 4 | 5 | 6 | 7 | 8 | 9 | 10 |
| Impact strength RT | DIN 53453 | cm.kp/cm² | un-broken | un-broken | un-broken | un-broken | un-broken | un-broken | 52 | 36 | un-broken | un-broken |
| −40°C | | " | " | " | " | " | " | 77 | 48 | 24 | 23 | 41 |
| Notched impact strength RT | DIN 53453 | cm.kp/cm² | 14 | 13 | 10 | 7.5 | 15 | 7 | 1.7 | 2 | 45 | 1.7 |
| −40°C | | | 2.6 | 2.5 | 2.5 | 2.3 | 5.2 | 4.6 | — | — | 2.6 | |

—Continued

| Property | Test Method | Measuring unit | EXAMPLES | | | | | | | | | |
|---|---|---|---|---|---|---|---|---|---|---|---|---|
| | | | 1 | 2 | 3 | 4 | 5 | 6 | 7 | 8 | 9 | 10 |
| Tensile strength $\sigma s$ | DIN 53455 | kp/cm² | 580 | 575 | 570 | 570 | 630 | 600 | 620 | 640 | | |
| Elongation at $\sigma s$ | DIN 53455 | % | 3.7 | 3.7 | 3.6 | 3.7 | 5.6 | 5.8 | 3.4 | 3.7 | | |
| Modulus of elasticity | DIN 53455 | 100 kp/cm² | 240 | 250 | 250 | 245 | 265 | 270 | 297 | 280 | | |
| Flexural strength $\sigma bF$ | DIN 53452 | kp/cm² | 975 | 970 | 970 | 975 | 945 | 950 | 1085 | 1090 | 900 | 930 |
| Sagging | DIN 53452 | mm | 4.6 | 4.6 | 4.6 | 4.8 | 5 | 5 | 4.7 | 4.9 | | 4.9 |
| Ball indentation hardness $H_{r30}$ | tentative standard DIN 53456 | kp/cm² | 1120 | 1130 | 1130 | 1120 | 1145 | 1150 | 1290 | 1270 | 950 | 1145 |
| Vicat dimensional stability in the heat | DIN 53460 | °C | 108 | 108 | 109 | 109 | 104 | 102 | 110 | 110 | 112 | 93 |

We claim:
1. A moulding composition consisting essentially of
a. 5 to 95 parts by weight of a polycarbonate of a dihydric phenol and a derivative of carbonic acid,
b. 5 to 95 parts by weight of a vinyl chloride polymer containing at least 80 parts by weight of vinyl chloride and
5 to 95 parts by weight of a graft copolymer obtained by polymerizing a monomer mixture of styrene, an alkyl styrene, methyl methacrylate, or a mixture thereof with acrulonitrile, an alkyl acrylonitrile, methyl methacrylate, or a mixture thereof, in the presence of a rubber selected from the group consisting of diene polymers and ethylene-propylene-non-conjugated diene terpolymers, a copolymer of styrene and maleic anhydride or a copolymer of ethylene and vinyl acetate containing 1 to 80 percent by weight of vinyl acetate.

2. The moulding composition of claim 1 consisting essentially of 20 to 80 parts by weight of each of (a), (b) and (c).

3. The moulding composition of claim 1 consisting essentially of 30 to 50 parts by weight of each of (a), (b) and (c).

* * * * *